3,066,094
RECOVERY OF HYDROCARBONS FROM SPENT CAUSTIC

John Weikart and Raymond L. Betts, Westfield, N.J., assignors to Esso Research and Engineering Company, a corporation of Delaware
No Drawing. Filed Feb. 27, 1957, Ser. No. 642,637
2 Claims. (Cl. 208—226)

This invention relates to an improved process for recovering valuable hydrocarbons from spent caustic solutions. More particularly it relates to a process of this nature wherein spent caustic solutions from the treatment of petroleum naphthas are hydrofined so as to increase the yield of valuable products.

The caustic treating of petroleum naphthas to remove acidic impurities such as phenols, thiophenols, mercaptans, naphthenic acids, etc., is well known, e.g. see chapter 4, "Chemical Refining of Petroleum," Kalichevsky and Stagner, 1942 Edition. In many cases the caustic is then neutralized or regenerated by some means and the thiophenols and the like are burned.

This invention provides an improved process for recovering vlauable hydrocarbons from the spent aqueous caustic solutions. The method comprises treating the spent caustic solutions to convert the salts to a water-insoluble oil. The oil is separated from the aqueous layer and hydrofined and the hydrocarbon is then recovered.

The petroleum naphthas which are caustic treated are those containing acid impurties, e.g. virgin, thermally cracked or catalytically cracked distillates.

The caustics utilized are by definition the hydroxides of alkali or alkaline earth metals or ammonia, sodium being preferred. The actual treatment with aqueous caustic is carried out in the conventional manner and is not the essence of this invention but for completeness the details are supplied herewith.

The naphtha is treated in the liquid phase although a vapor phase treatment can be employed. The conditions are, e.g. a temperautre of 70° to 130° F. and caustic concentration of 3° to 50° Bé., 3 to 15 normal. The conditions can be adjusted depending on the type of acids present, the degree of extraction required and the type of operation such as once-thru or recycle mixer-settler operation or countercurrent treating.

The term "spent caustic solution" as used herein connotes the aqueous caustic solution after treatment of the naphtha. The spent aqueous caustic solution is then treated to convert the contained salts to water-insoluble oils, e.g., preferably by acid treating to spring the corresponding acids from the naphthenates, phenates, thiophenates and mercaptides. The spent caustic solution can be partially regenerated by removal of mercaptides with formation of equivalent free caustic by boiling, steaming, or oxidation which converts the mercaptides to insoluble disulfides. More complete regeneration, including removal of phenates and naphthenates can be accomplished by acidification with flue gas or mineral acids. The term "water-insoluble" is, of course, relative and connotes oils which can be separated from the aqueous material by layer formation. More complete separation can be effected by washing with a distillate.

These methods of converting alkali metal salts to water insoluble oils are known but are elaborated upon below for completeness.

The spent aqueous caustic solution can be acid treated with reagents such as $SO_2$, $CO_2$ and mineral acids, preferably sulfuric. The acid gases, $SO_2$ and $CO_2$, can be used at substantially atmospheric pressure and temperatures of 100° to 200° F. in combination with steam to strip the acid oils overhead. They can also be used at low temperatures (70°–130° F.) at high pressures (200 to 500 p.s.i.g.) which is effective for separating all acids including naphthenic acids. Mineral acids of any concentration above about 0.1 N can be used depending on convenience; preferred temperature range is 70° to 150° F.

The resulting water insoluble oil prepared by any of the above identified methods is separated from the remaining aqueous layer by means known in the art such as decanting, salting out, or extraction with solvents such as petroleum distillates.

The separated oil after this treatment is then hydrofined in the conventtional manner. For convenience the conditions are presented below.

CONDITIONS IN HYDROFINER

| | Broad Range | Preferred Range |
|---|---|---|
| Temperature, °F | 500–750 | 600–700 |
| Pressure, p.s.i.g | 100–1,000 | 200–400 |
| Feed Rate, v./Hr./v | 0.1/16+ | 0.25–4 |
| $H_2$ Treat, s.c.f./b | 200–3,500 | 500–1,500 |
| $H_2$ Consumption, s.c.f./b | 10–1,000 | 300–500 |

The hydrofining catalysts that can be employed in the hydrofining include 5–15% molybdena oxide on activated alumina, mixtures of cobalt oxides (2–6 wt. percent) and molybdenum oxides (6–15 wt. percent), an equivalent amount of cobalt molybdate on activated alumina, and other sulfur resistant hydrogenation catalysts such as nickel tungsten sulfide, molybdenum sulfide, etc.

Regeneration of the catalyst may be required periodically, depending largely upon the nature of the feed stock. This regeneration is conveniently carried out at a temperature of about 700° to 1100° F. with an oxygen-containing gas.

In the hydrofining operation, the oil and hydrogen are contacted with catalyst by continuous flow through a vessel packed with catalyst. The oil feed to the reactor is preheated to the required temperature by means of a furnace or similar means. Hydrogen may or may not be heated prior to feeding to the reactor depending on the quantity used. The degree of contact of oil saturated with hydrogen with the catalyst is determined by the ratio of the oil flow rate to the catalyst volume.

After the hydrofining process has been carried out the liquid is then passed to a stripper to remove residual $H_2S$ then the hydrocarbon oil can be recovered as by fractionation or kept intact.

The reactions that take place during the hydrofining of mercaptans, disulfides, phenols, and carboxylic acids are shown below:

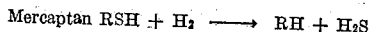

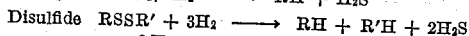

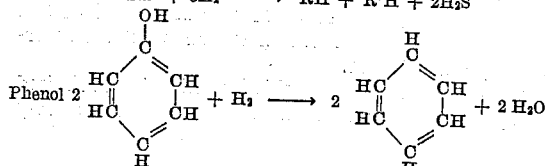

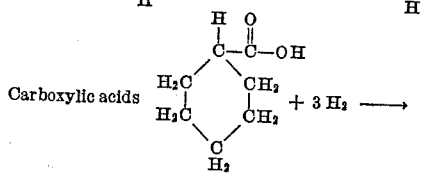

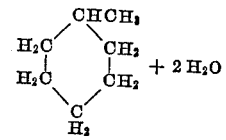

The advantages of this invention will be better understood by reference to the following examples.

*Example 1*

A heavy catalytic naphtha was caustic treated in a mixer-settler, recycle operation with aqueous NaOH of 15° Bé. at a temperature of 90° F. with a 10 vol. percent treat each cycle. The spent caustic which had a 23 vol. percent content of acid oil was neutralized with 98% $H_2SO_4$ and the acids separated after settling. The acid oil had aliphatic mercaptans added. These materials represent about 16% of the total mercaptan sulfur. Since such materials are probably absent from the raw acids used but would be present in acids from light catalytic or virgin naphthas, they were added to demonstrate they are readily handled when present. The inspection after the addition was as follows:

Mercaptan No., mg. S/100 ml. _____ 5824
Sulfur content, wt. percent:
   Total _____ 6.4
   Due to mercaptans _____ 5.8
Mercaptans, wt. percent _____ 23.4
Phenols, wt. percent _____ 76.6

The acid oil was then diluted with 75 parts/25 parts by volume of a hydrofined desulfurized naphtha. The dilution was for convenience in handling and increased accuracy. The blend was hydrofined as follows:

Temperature, ° F. _____ 650.
Pressure, p.s.i.g. _____ 400.
V./hr./v. _____ 1.
100% hydrogen gas rate _____ 1500 s.c.f./b.
Catalyst _____ Cobalt molybdate/ activated alumina.

The inspection on the hydrofined blend and feed was as follows:

|  | Hydrofined Feed | | Hydrofiner Product |
|---|---|---|---|
|  | Total Feed | Naphtha Component |  |
| Sulfur, wt. percent | 1.98 | 0.001 | 0.02 |
| Mercaptan No., mg. S/100 ml | 1,488 |  | 1.0 |
| Mercaptans, wt. percent | 6.0 |  | 0.005 |
| Phenols, wt. percent | 24.0 |  | 0.05 |
| CF RR Octane Clear |  | 46.1 | 57.5 |
| Conversion, wt. percent: |  |  |  |
| Desulfurization |  |  | 99 |
| Phenols |  |  | 99.9 |

It should be noted from these figures how the concentration of aromatics was increased and the sulfur content decreased. Additionally, the hydrocarbons obtained by hydrofining the acid oils have a clear research blending value in this base stock of 91.6. Thus a valuable product was recovered.

The advantages of this invention will be apparent to the skilled in the art. Gasoline yields are improved. High octane blending agents are made available. All of this is accomplished by treatment of materials which are otherwise a disposal problem.

It is to be understood that this invention is not limited to the specific examples which have been offered merely as illustrations and that modifications may be made without departing from the spirit of the invention.

What is claimed is:

1. Process for upgrading cracked naphthas which comprises treating said naphthas in the vapor phase with caustic having a concentration of 3° to 50° Bé. at a temperature between 70° and 130° F.; separating spent caustic from treated naphtha; neutralizing the spent caustic by contacting with an acid selected from the group consisting of sulfur dioxide and carbon dioxide at a temperature between 100° and 200° F. and sulfuric acid having a concentration above about 0.1 N at a temperature between 70° and 150° F.; separating the resulting water-insoluble oil from the aqueous layer, said oil containing phenols, thiophenols, mercaptans, disulfides, and naphthenic acid; treating said water-insoluble oils with hydrogen in contact with cobalt molybdate on activated alumina at 500° to 750° F. under a pressure of 100 to 1000 p.s.i.g. to convert the phenols, thiophenols, mercaptans, naphthenic acids, and disulfides to hydrocarbons; recovering the resulting hydrocarbons and adding them to the treated cracked naphtha to upgrade same.

2. Process for upgrading cracked naphthas which comprises treating said naphthas in the vapor phase with caustic having a concentration of 3° to 50° Bé. at a temperature between 70° and 130° F.; separating spent caustic from treated naphtha; neutralizing the spent caustic by contacting with an acid selected from the group consisting of sulfur dioxide and carbon dioxide at a temperature between 100° and 200° F. and sulfuric acid having a concentration above about 0.1 N at a temperature between 70° and 150° F.; separating the resulting water-insoluble oil from the aqueous layer, said oil containing phenols, thiophenols, mercaptans, disulfides, and naphthenic acid; diluting the water-insoluble oils with naphtha hydrocarbons; treating said diluted water-insoluble oils with hydrogen in contact wtih cobalt molybdate on activated alumina at 600° to 900° F. under a pressure of 200 to 400 p.s.i.g. to convert the phenols, thiophenols, mercaptans, naphthenic acids, and disulfides to hydrocarbons; recovering the resulting hydrocarbons and adding them to the treated cracked naphtha to upgrade same.

References Cited in the file of this patent

UNITED STATES PATENTS

| | | |
|---|---|---|
| 2,331,034 | Lazar et al. | Oct. 5, 1943 |
| 2,393,288 | Byrns | Jan. 22, 1946 |
| 2,394,978 | Brandon | Feb. 19, 1946 |
| 2,523,154 | Shmidl | Sept. 19, 1950 |
| 2,753,292 | Porter et al. | July 3, 1956 |
| 2,782,146 | Paulsen et al. | Feb. 19, 1957 |
| 2,795,531 | Meguerian et al. | June 11, 1957 |

OTHER REFERENCES

"Faraday's Encyclopedia of Hydrocarbon Compounds $C_6$," sheets 2, No. 21; 6, No. 77; 7, No. 95; 9, No. 123; and 12, No. 172. 1945. Chemindex Limited, Manchester 2, England.

Wertheim: "Textbook of Organic Chemistry," 3rd Edition; 1952; pages 132–134, 459. The Blakiston Company, New York.